United States Patent [19]
Ropertz

[11] Patent Number: 5,632,245
[45] Date of Patent: May 27, 1997

[54] ACTUATING DEVICE FOR A THROTTLING MEMBER

[75] Inventor: Peter Ropertz, Markgröningen, Germany

[73] Assignee: Robert Bosch GmbH, Stuttgart, Germany

[21] Appl. No.: 617,803

[22] PCT Filed: Sep. 30, 1994

[86] PCT No.: PCT/DE94/01167

§ 371 Date: Mar. 2, 1996

§ 102(e) Date: Mar. 2, 1996

[87] PCT Pub. No.: WO95/09977

PCT Pub. Date: Apr. 13, 1995

[30] Foreign Application Priority Data

Oct. 2, 1993 [DE] Germany .................. 43 33 676.0

[51] Int. Cl.⁶ .............................................. F02D 9/08
[52] U.S. Cl. .............................................. 123/337
[58] Field of Search .......................... 123/337, 403, 123/478, 336; 251/337

[56] References Cited

U.S. PATENT DOCUMENTS

| | | | |
|---|---|---|---|
| 4,860,706 | 8/1989 | Suzuki et al. | 123/337 |
| 4,880,207 | 11/1989 | Matsumoto et al. | 251/337 |
| 5,081,972 | 1/1992 | Daly et al. | 123/337 |
| 5,101,784 | 4/1992 | Tamaki | 123/337 |
| 5,188,078 | 2/1993 | Tamaki | 123/403 |
| 5,474,046 | 12/1995 | Corona | 123/478 |
| 5,522,361 | 6/1996 | Pickman et al. | 123/336 |

*Primary Examiner*—Raymond A. Nelli
*Attorney, Agent, or Firm*—Edwin E. Greigg; Ronald E. Greigg

[57] ABSTRACT

A control for a throttling member, for example a throttle butterfly of an internal combustion engine. The actuating device has an actuating member which is designed as a plastic part and is molded onto one end of an adjusting shaft by means of an inner fixing sleeve and a recess made in the adjusting shaft in the form of a slot which is filled with plastic, thus allowing reliable torque transmission. The actuating device is suitable for throttling devices of mixture-compressing, spark-ignition or air-compressing, self-ignition internal combustion engines.

8 Claims, 2 Drawing Sheets

ACTUATING DEVICE FOR A THROTTLING MEMBER

PRIOR ART

The invention is directed to an actuating device for a throttling member of an internal combustion engine. A disclosure has already been made (German Offenlegungsschrift 4,133,858, U.S. Pat. No. 5,216,992) of an actuating device in which, for the control of a throttling member, for example a throttle butterfly of an internal combustion engine, an adjusting shaft is connected in torsionally rigid fashion to an actuating member. The actuating member is in the form of a cable pulley made of plastic to enable a Bowden cable, for example, to be guided and held on the circumference of the cable pulley. To fix the cable pulley, it is pushed onto a free end of the adjusting shaft by means of a U-shaped fixing strap. The fixing strap is provided in order to make the plastic cable pulley more robust, thus enabling torque transmission. To enable the cable pulley to be connected in torsionally rigid fashion to the adjusting shaft, the adjusting shaft has two opposite flaps on the end of the adjusting shaft to receive the fixing strap plug-in fashion in a through opening shaped to match the shape of the end of the adjusting shaft, an external thread being cut between both flaps to enable the fixing strap to be held axially by means of a fastening nut.

The design of the actuating member as a separate component which can be pushed on gives rise to a considerable outlay on assembly, particularly when the actuating device is mass-produced, since it is necessary successively to mount individual components in the following sequence: actuating member, washer and fastening nut. In particular, the production of the plastic cable pulley with the fixing strap held in it and the formation of the end of the adjusting shaft with flaps and a thread necessitates a relatively high outlay on manufacture, resulting in high production costs.

ADVANTAGES OF THE INVENTION

In contrast, the actuating device according to the invention for a throttling member has the advantage that the actuating device can be produced in a simple manner, the outlay on assembly and the production costs being lowered, in particular, by the elimination of the screwed joint required by the prior art.

Advantageous developments of and improvements to the actuating device are possible by virtue of the measures presented hereinafter.

It is advantageous that an actuating member of the actuating device is simple to produce in various forms, for example in the form of a cable pulley or with a holding stud.

DESCRIPTION OF THE DRAWINGS

Exemplary embodiments of the invention are illustrated in simplified form in the drawing and explained in greater detail in the description which follows.

DESCRIPTION OF THE EXEMPLARY EMBODIMENTS

Figure 1:
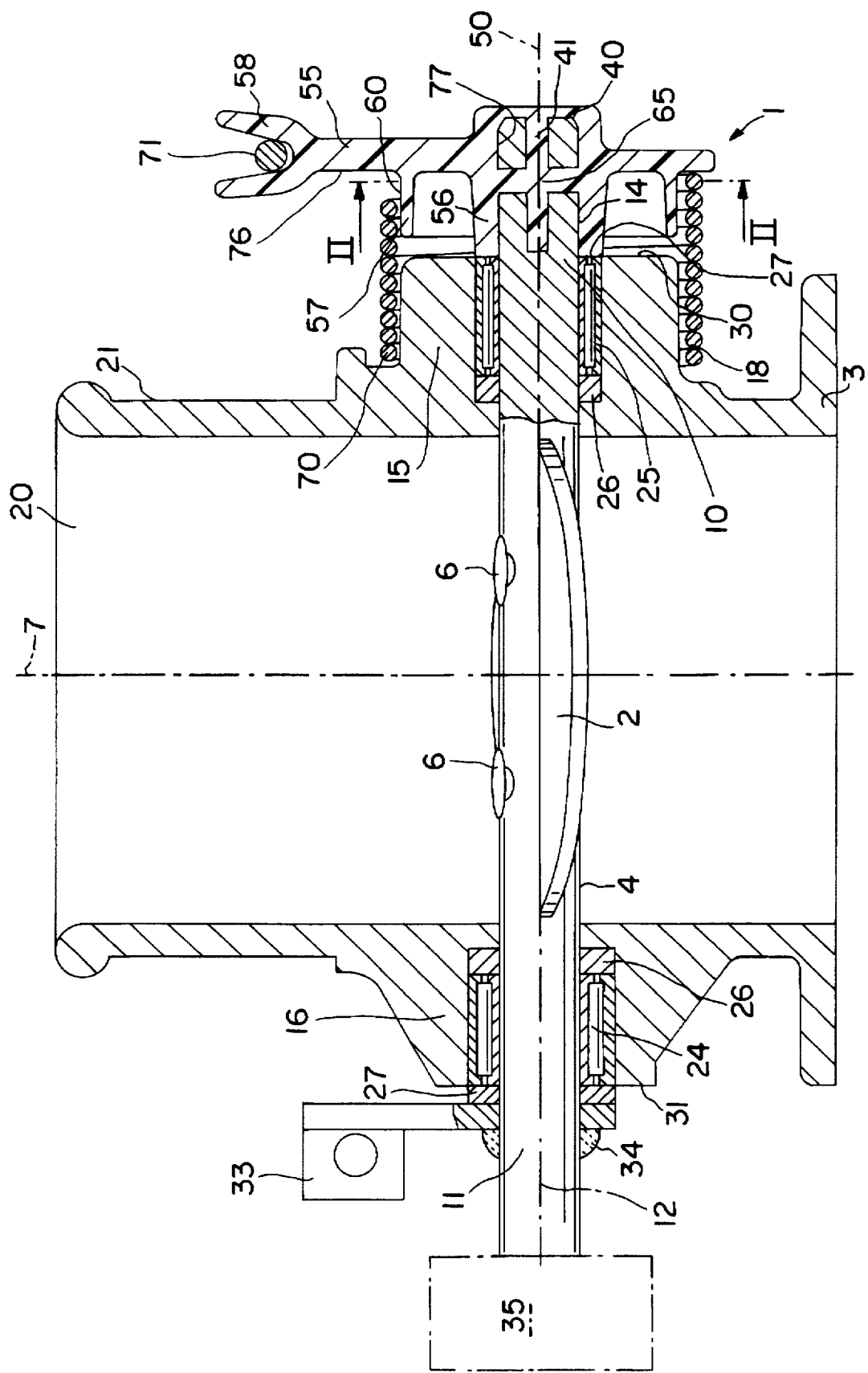
FIG. 1 shows a section of a first exemplary embodiment of an actuating device according to the invention.

FIG. 1 shows, in sectional representation, an actuating device I designed in accordance with the invention, which is provided with an adjusting shaft 4 and is used to control a throttling member which is, for example, in the form of a circular throttle butterfly 2. The throttle butterfly 2 is part of a throttling device of a mixture-compressing, spark-ignition or air-compressing, self-ignition internal combustion engine and is connected in torsionally rigid fashion to the adjusting shaft 4, which is, for example, of cylindrical design and is mounted at both ends, for example, in a throttle body 3. The throttle valve 2 controls the quantity of air flowing into an intake conduit 20 of the throttle body 3 approximately parallel to a longitudinal axis 7, or an inflowing fuel-air mixture, to a greater or lesser extent. For the torsionally rigid connection of the throttle valve 2, the adjusting shaft 4 is, for example, provided with an elongated recess corresponding to the dimensions of the throttle valve 2, into which the throttle valve 2 can be inserted and then connected to the adjusting shaft 4 by means, for example, of two screwed joints 6. The adjusting shaft 4 runs centrically with respect to an axis of rotation 12 of the throttle valve 2 transversely through the throttle body 3. In this arrangement, the adjusting shaft 4 penetrates the intake conduit 20 on two sides and is inserted rotatably into two sleeve-shaped shoulders 15, 16, arranged coaxially with respect to the axis of rotation 12 of the adjusting shaft 4, on an outer wall 21 of the throttle body 3, these shoulders being referred to below as adjusting part 15 and measuring part 16. Two bearing devices 24, 25 in the form, for example, of rolling-contact bearings, in particular needle bearings, or in the form of plain bearings are provided to support the adjusting shaft 4.

The bearing device 24 is mounted within the measuring part 16 shown on the left in FIG. 1, and bearing device 25 is mounted within the adjusting part 15, shown on the right in FIG. 1. To seal off the bearing devices 24, 25, two seals 26 are provided, in the form of sealing rings which rest against and seal bearing end faces 27 of the bearing devices 24, 25, the said end faces 27 facing the throttle butterfly 2. The adjusting shaft 4 projects with a first adjusting-shaft end 10, illustrated on the right in FIG. 1, beyond an annular outer surface 30 of the adjusting part 15 and ends with an end face 40. A second end 11, illustrated on the left in FIG. 1, of the adjusting shaft 4 projects beyond an annular outer surface 31 of the measuring part 16. For electronic idle control or engine-power control, a coupling lever 33 can be connected to the adjusting shaft 4 at the second end 11 of the adjusting shaft by a welded joint 34 and is actuated by a throttle-butterfly-adjusting motor which, for its part, is activated by an electronic control unit. To transmit electrical signals and for monitoring, use is made of an angular resolver 35, illustrated in broken lines in FIG. 1, which measures a rotation of the throttle butterfly 2 at the second end 11 of the adjusting shaft.

Figure 2:
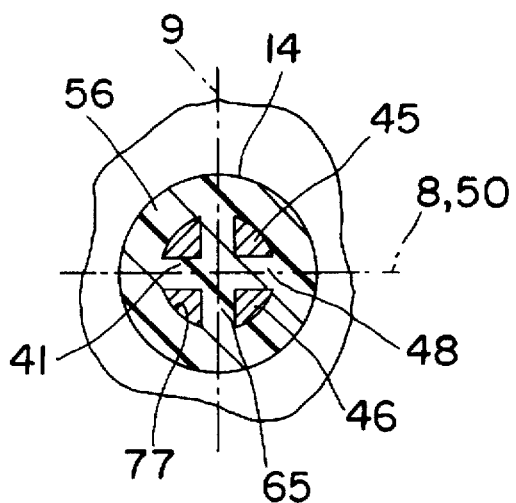
FIG. 2 shows a section along the line II—II in FIG. 1.

According to the invention, the first end 10 of the adjusting shaft has an elongated recess 41 which extends through the adjusting shaft 4 along the axis of rotation 12 in the form of a slot and extends axially approximately from the outer surface 30 of the adjusting part 15 to the end surface 40 of the first end 10 of the adjusting shaft. The recess 41 divides the first end 10 of the adjusting shaft, as illustrated in FIG. 2, a partial sectional representation along a line II—II in FIG. 1, into two semicylindrical parts 45, 46 of approximately equal size, the end surface 40 being divided into two partial end surfaces each having a semicircular portion. The semicylindrical parts 45, 46 are oriented symmetrically at a radial distance from a section plain 50 formed by the axis of rotation 12 and a horizontal axis 8 oriented transversely to the longitudinal axis 7 and transversely to the axis of rotation 12. In FIG. 2, the semicircular cylinder 45 is shown above the horizontal axis 8 or section plain 50, and the semicircular cylinder 46 is shown below it.

The actuating device I is formed by an actuating member 55 and the adjusting shaft 4. According to the invention, the actuating member 55 is designed as a plastic part and is molded onto the first end 10 of the adjusting shaft and has an inner fixing sleeve 56 and an outer fixing sleeve 57. To hold the actuating member 55 radially, an outer, cylindrical circumferential surface 14 of the first end 10 of the adjusting shaft is surrounded by an inner wall 77 of cylindrical design of the inner fixing sleeve 56, the recess 41 being filled with the plastic of the inner fixing sleeve 56 when the actuating member 55 is molded on, entailing the formation of a transverse web 48 of plastic which extends radially inwards, starts at both ends from the inner wall 77 of the inner fixing sleeve 56 and fills the recess 41 in order, through an integral connection to the inner fixing sleeve 46, to permit torque transmission. To hold the actuating member 55 axially, a through opening 65 is provided which, for example, penetrates the first end 10 of the adjusting shaft radially in the form of a hole, along a hole axis 9 offset parallel to the longitudinal axis 7 and is provided axially approximately in the center of the axial extent of the recess 41. The through opening 65 passes through the recess 41 and, like the recess 41, it is thus filled with the plastic of the inner fixing sleeve 56. The elongated transverse web 48 permits reliable torque transmission, with the result that there is no damage even in the case of critical cases of loading, such as "snapping back" from a position in which the actuating device 1 is preloaded by a return spring 70, the plastic-filled through opening 65 ensuring reliable axial holding of the actuating member 55. As illustrated in FIG. 1, the inner fixing sleeve 56 has a somewhat greater axial extent than the recess 41, the inner fixing sleeve 56 thus extending from the outer surface 30 of the adjusting part 15 with a small axial clearance from the bearing end face 27 of the bearing device 25 or making gentle contact with the latter and somewhat beyond the end face 40 of the first end 10 of the adjusting shaft in order to cover the end face 40 with the plastic of the inner fixing sleeve 56.

The return spring 70 wound onto an outer wall 60 of the outer fixing sleeve 57 and onto an outer wall 18 of the adjusting part 15 serves primarily to generate a restoring force in the closing direction of the throttle butterfly 2 and, in addition, to reset a Bowden cable 71 which is connected to the actuating member 55 and, in conjunction with a gas pedal of an internal combustion engine, effects a rotation of the adjusting shaft 4 and of the throttle butterfly 2. The outer fixing sleeve 57 has a larger outside diameter than the inner fixing sleeve 56, with the result that the outer fixing sleeve 57 surrounds the inner fixing sleeve 56 with a radial clearance relative to the outer wall 60, the outer fixing sleeve 57 extending axially approximately as far as the hole axis 9, with an axial clearance relative to the bearing device 27 and to the outer surface 30 of the adjusting part 15.

Adjoining the inner fixing sleeve 56 integrally in the radial direction, as a disk-shaped extension of the inner fixing sleeve 56, is the actuating member 55. As illustrated in FIG. 1, the actuating member 55 is provided at a position offset to the right of the hole axis 9 and extends radially with a parallel offset to the hole axis 9 beyond the integrally connected outer fixing sleeve 57, and has, for example, the shape of a cable pulley which has a fork-shaped end cross section 58 in order to accommodate and hold the Bowden cable 71 along the periphery of the cable pulley.

The actuating member 55 is, for example, produced by injection-molding of plastic, the first adjusting-shaft end 10 being surrounded, for example, by two mold parts which are arranged opposite in relation to the axis of rotation 12 and, for example, have a mold cavity shaped to match the external shape of the actuating member 55 with the inner fixing sleeve 56 and the outer fixing sleeve 57, into which plastic is injected. After the solidification of the plastic and the removal of the mold parts, the actuating member 55 rigidly connected to the adjusting shaft 4 is released. During the injection operation, care must be taken to ensure that both the recess 41 and the through opening 65 are filled with plastic in order to obtain a torsionally rigid connection. In the case of an increase in temperature of the actuating device 1, for example due to the heat given off by the internal combustion engine, the plastic in the recess 41 and in the through opening 65 expands and, as a result, is advantageously clamped more firmly in the recess 41 and in the through opening 65 so as to guarantee reliable torque transmission and axial holding of the actuating member 55 even when the actuating device I is at high temperatures.

Figure 3:
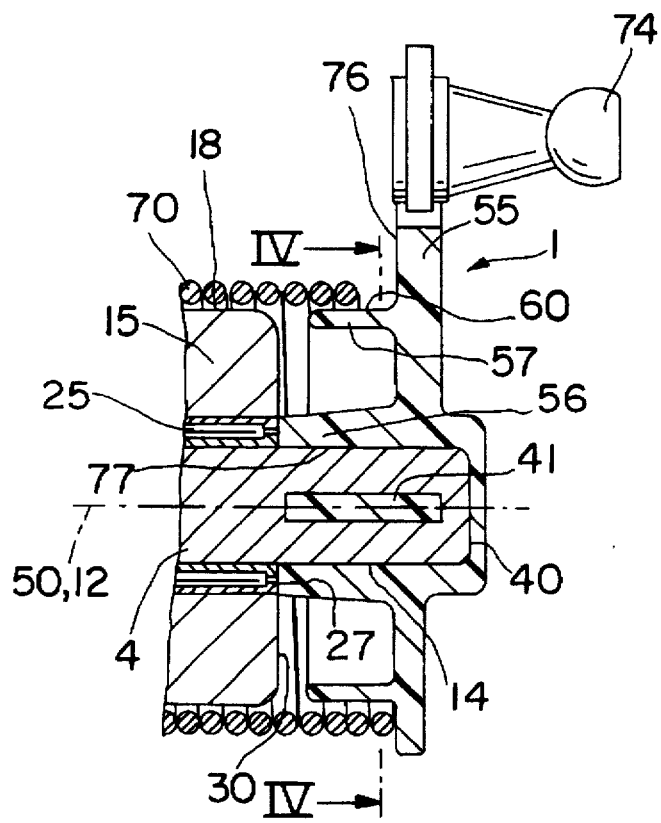
FIG. 3 shows a section of a second exemplary embodiment of the actuating device according to the invention in a partial view and FIG. 4 shows a section along the line IV—IV in FIG. 3 of the second exemplary embodiment.
Figure 4:
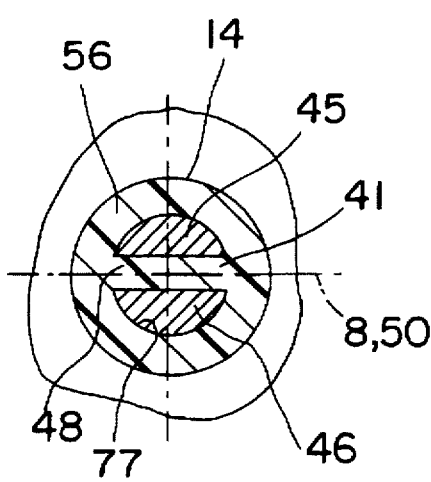

FIG. 3 and FIG. 4 show a second exemplary embodiment of the actuating device I according to the invention, all parts which are the same or have the same action being denoted by the same reference numerals as in the first exemplary embodiment of FIGS. 1 and 2. FIG. 3 shows a section through the actuating device 1, which, in contrast to the exemplary embodiment of FIGS. 1 and 2, has an actuating member 55 of partially disk-shaped or lever-shaped design with a holding stud 74 which serves for the push-on acceptance of the Bowden cable 71. In contrast to the first exemplary embodiment, the recess 41 is designed as a slot which does not extend as far as the end face 40 but extends approximately as far as the outer surface 30 of the adjusting part 15, with an axial clearance from the end face 40, and the end face 40 is thus not divided, there being, as in the first exemplary embodiment, two semicircular cylinders 45 and 46 which are oriented symmetrically with respect to the section plain 50 and, as illustrated in FIG. 4, which is a sectional representation along the line IV—IV of FIG. 3, are connected to one another in the region of the end face 40. The recess 41 is filled with plastic during the production of the actuating member 55, as in the first exemplary embodiment, with the result that there is once again a transverse web 48 for torque transmission which extends radially inwards from the inner fixing sleeve 56 but, at an axial distance from the end face 40, also allows retention of the actuating member 55 in the axial direction, thus advantageously allowing the omission of the through opening 65.

The foregoing relates to preferred exemplary embodiments of the invention, it being understood that other variants and embodiments thereof are possible within the spirit and scope of the invention, the latter being defined by the appended claims.

I claim:

1. An actuating device (1) for a throttling member (2) of an internal combustion engine, the said throttling member being accommodated in a throttle body (3), with an adjusting shaft (4) which is connected to the throttling member (2) and is mounted in the throttle body (3), with a plastic actuating member (55) which effects a rotation of the adjusting shaft (4) and is connected in torsionally rigid fashion to the adjusting shaft (4) at one end (10) of the adjusting shaft, wherein the adjusting shaft (4) has a recess (41) which passes through the adjusting shaft radially and, in the axial direction of the adjusting shaft, appears in the form of a slot at the one end (10) of the adjusting shaft which projects from the throttle body (3) and the actuating member (55) is molded onto the one end (10) of the adjusting shaft in such a way that the recess (41) is filled with plastic.

2. The actuating device as claimed in claim 1, wherein the recess (41) extends as far as an end face (40) of the end (10) of the adjusting shaft.

3. The actuating device as claimed in claim 2, wherein the end (10) of the adjusting shaft has a through opening (65) provided transversely to the recess (41).

4. The actuating device as claimed in claim 1, wherein the actuating member (55) is in the form of a cable pulley.

5. The actuating device as claimed in claim 1, wherein the actuating member (55) has a holding stud (74).

6. The actuating device as claimed in claim 1, wherein, in the axial direction, the recess (41) extends along the end (10) of the adjusting shaft in the form of a slot, at an axial distance from the end face (40).

7. The actuating device as claimed in claim 2, wherein the end face (40) of the end (10) of the adjusting shaft is covered by the actuating member (55).

8. The actuating device as claimed in claim 1, wherein the actuating member (55) has an inner fixing sleeve (56) and, with a radial clearance from the latter, an outer fixing sleeve (57).

* * * * *

UNITED STATES PATENT AND TRADEMARK OFFICE
CERTIFICATE OF CORRECTION

PATENT NO. :  5,632,245
DATED      :  May 27, 1997
INVENTOR(S) :  Peter ROPERTZ

It is certified that error appears in the above-indentified patent and that said Letters Patent is hereby corrected as shown below:

Title page:  Change item [86] to read as follows:

§ 371 Date:     Mar.7, 1996

§ 102(e) Date:  Mar.7, 1996

Signed and Sealed this

Twenty-third Day of September, 1997

Attest:

BRUCE LEHMAN

Attesting Officer     Commissioner of Patents and Trademarks